Figure 1:
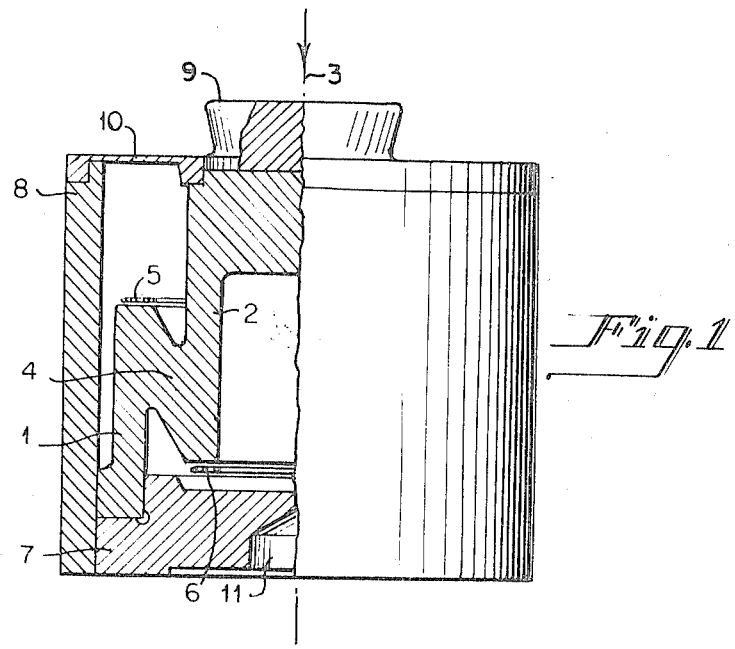

United States Patent

Birkholtz

[15] 3,643,502
[45] Feb. 22, 1972

[54] ELECTROMECHANICAL FORCE MEASURING CELL

[72] Inventor: Gottfried Birkholtz, Weiterstadt, Germany
[73] Assignee: Carl Schenck Maschinenfabrik GmbH, Darmstadt, Germany
[22] Filed: Sept. 24, 1970
[21] Appl. No.: 75,042

[30] Foreign Application Priority Data

Oct. 3, 1969 Germany .................... P 19 49 924.2

[52] U.S. Cl. .......................................................... 73/141 A
[51] Int. Cl. ............................................................ G01l 1/22
[58] Field of Search ................... 73/141 A, 398 AR; 338/5; 177/211

[56] References Cited

UNITED STATES PATENTS

| | | | |
|---|---|---|---|
| 2,458,481 | 1/1949 | Ruge | 73/141 A |
| 2,487,595 | 11/1949 | Ruge | 73/141 A |
| 3,320,802 | 5/1967 | Birkholtz | 73/141 A |
| 3,453,582 | 7/1969 | Birkholtz | 73/141 A UX |

FOREIGN PATENTS OR APPLICATIONS

| | | | |
|---|---|---|---|
| 1,155,922 | 10/1963 | Germany | 73/141 A |
| 1,156,580 | 10/1963 | Germany | 73/141 A |

*Primary Examiner*—Charles A. Ruehl
*Attorney*—Curt M. Avery, Arthur E. Wilfond, Herbert L. Lerner and Daniel J. Tick

[57] ABSTRACT

Electromechanical force-measuring cell which includes a deformation member formed of two cylindrical tubes of different diameters having a common central axis extending in direction of measurement of a force, one end of each of the tubes being adapted, respectively, to absorb an applied force and a force reactive thereto, a conical tube interconnecting the other ends, respectively, of the tubes, the other ends facing in opposite directions along the common central axis, and force-measuring means comprising a mechanical-to-electrical transducing device disposed at the respective other ends of the cylindrical tubes to which the conical tube is connected, for converting to an electrical signal a deformation produced in the deformation member by action of a force applied thereto.

6 Claims, 2 Drawing Figures

ELECTROMECHANICAL FORCE MEASURING CELL

My invention relates to electromechanical force-measuring cell and, more particularly, to such cell having a deformation member formed of two cylindrical tubes of different diameters having a common central axis extending in direction of measurement of a force, an end of each of the tubes serving to absorb an applied and a reactive force, respectively, the other ends, respectively, of the tubes being interconnected by a conical tube.

Force measuring cells have been known heretofore which have deformation members in the form of a cylindrical tube extending coaxially to the axis of measurement. The force being measured is applied to one end of the tube through a conical tube, the introduction of a reactive force to the other end of the tube being effected through another conical tube disposed in mirror-image relationship to the first-mentioned conical tube with respect to a central plane extending therebetween perpendicularly to the measurement axis. Under the applied effect of a compressive force, the wall of the cylindrical tube arches or curves outwardly in the shape of a barrel. This has the disadvantage that in the individual sections of the electrical measuring elements disposed on the outer surface thereof, such as expansive measuring strips, resistance wire windings, semiconductor measuring elements or the like, varying deformations in the tube are sensed by the measuring element sections in accordance with their location or the outer surface of the tube, and thereby nonlinearities are produced in the measurement result. In order to prevent this from happening, in other heretofore known force-measuring cells, conical tubes for introducing the applied and reactive forces are disposed in a special manner, one of the conical tubes extending within the cylindrical tube forming the deformation member proper, and the other of the conical tubes extending on the outside of the cylindrical tube. Under the action of an applied force, this results in a parallel displacement of the wall of the cylindrical tube in radial direction and therewith a correspondingly equal affect on the electrical measuring element at the wall of the cylindrical tube. In a special embodiment of these known force-measuring cells, two cylindrical tubes provided with such conical force-introducing tubes as deformation members are connected so as to conduct the applied force serially, whereby the force-introducing tube of the one deformation member passes or merges into the force-introducing tube of the other deformation member without change in direction. Such force-measuring cells are relatively complex and costly to produce.

It is an object of my invention, accordingly, to produce electromechanical force-measuring cell which meets the same requirements with regard to force-measuring technology as the last-mentioned heretofore known force-measuring cells but which is considerably simpler and less costly to produce than the conventional cells.

It is another object of my invention, in order to meet the high demands imposed by measurement technology, to provide such force-measuring cell with components that are assemblable without screws or similar fasteners, thereby assuring that there will be only a small temperature gradient practically along uniform heat-conductive paths to the measuring elements in the measurement direction, and that the assembled cell will occupy a minimum amount of space.

With the foregoing and other objects in view, I provide therefore in accordance with my invention, electromechanical force-measuring cell comprising a deformation member formed of two cylindrical tubes of different diameters having a common central axis extending in direction of measurement of a force, one end of each of the tubes being adapted, respectively, to absorb an applied force and a force reactive thereto, a conical tube interconnecting the other ends, respectively, of the tubes, the other ends facing in opposite direction along the common central axis, and force-measuring means comprising a mechanical-to-electrical transducer disposed at the respective other ends of the cylindrical tubes to which the conical tube is connected, for converting to an electrical signal a deformation produced in the deformation member by action of a force applied thereto.

In accordance with another feature of the invention, the cylindrical tubes concentrically telescope one another.

In accordance with a further feature of the invention, I also provide a hollow rigid casing portion surrounding the deformation member, and a casing base located at one end of the tube adapted to absorb the reactive force being shrink-fittingly clamped between the hollow casing portion and the casing base.

In accordance with an additional feature of my invention, I provide an annular casing cover formed as a guide membrane and having rigid outer peripheral and inner peripheral edge portions, and a force-introducing member located at the one end of the other tube adapted to absorb the applied force, the force-introducing member and the one end of the other tube being shrink-fittingly secured by the inner peripheral edge portion of the guide membrane, the out peripheral edge portion of the guide membrane being shrink-fittingly secured to the hollow rigid casing portion.

In accordance with a concomitant feature of the invention, I include an auxiliary deformation member connected in parallel force-transmitting relationship to the first-mentioned deformation member whereby the applied force is absorbed in part by both of the deformation members, the auxiliary deformation member being of such dimension that the part of the applied force absorbed thereby produces a deformation therein, within the measuring range and in the measurement direction, that is equal in size to the deformation produced in the first-mentioned deformation member by the part of the applied force absorbed thereby.

Other features which are considered as characteristic for the invention are set forth in the appended claims.

Although the invention is illustrated and described herein as embodied in electromechanical force-measuring cell, it is nevertheless not intended to be limited to the details shown, since various modifications and structural changes may be made therein without departing from the spirit of the invention and within the scope and range of equivalents of the claims.

Figure 2:
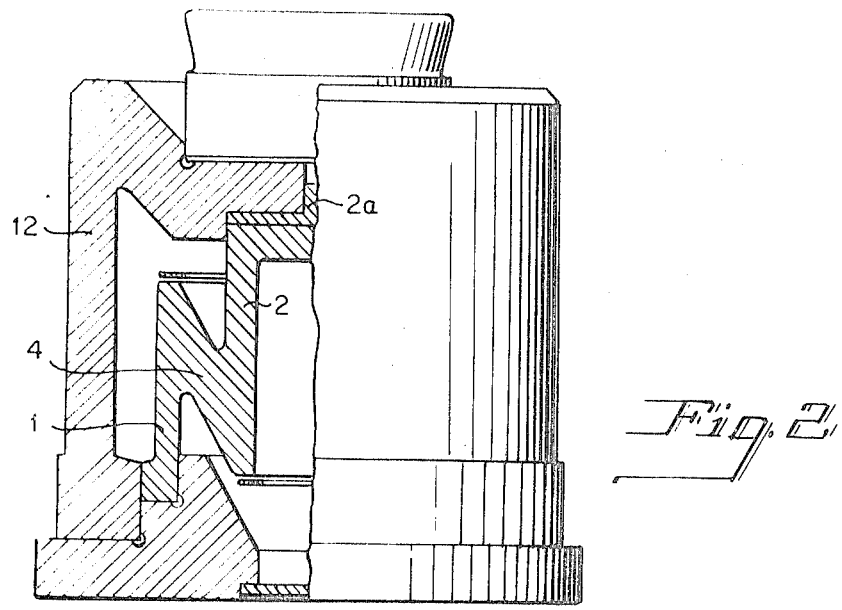

The construction and method of operation of the invention, however, together with additional objects and advantages thereof will be best understood from the following description of specific embodiments when read in connection with the accompanying drawings, in which:

FIG. 1 is an axial view, partly in longitudinal section of one embodiment of an electromechanical force-measuring cell according to my invention, showing a deformation member formed of concentrically telescoped cylindrical tubes; and FIG. 2 is a view similar to that of FIG. 1 of another embodiment of the invention which includes an auxiliary deformation member to permit the measurement of greater forces than with the embodiment of FIG. 1.

Referring now to the drawing, and first, particularly, to FIG. 1 thereof, there is shown therein a force-measuring cell according to my invention which has a deformation member formed of two cylindrical tubes 1 and 2 of different diameter, which concentrically and coaxially telescope one another. In operation, a force is applied in direction of the arrow i.e., vertically downwardly as shown in FIG. 1, along the central axis 3 which coincides with the measurement axis of the force-measuring cell of the invention. As viewed in the direction of the measurement axis, the respective inner ends of the tubes 1 and 2, which are disposed in opposite directions, are connected to one another by a conical tube 4. At the faces of the ends of the tubes 1 and 2 that are connected to the conical tube 4 mechanical-to-electrical transducing devices or electrical measuring elements 5 and 6, such as windings of electrical resistance wire, electrical resistance wire, electrical expansion measuring strips or the like, are disposed and are connected in such manner to the adjacent surfaces of the tube ends that any deformation of the tubes 1 and 2 or the surfaces at the adjacent ends thereof are transmitted thereto and thereby produce therein an electrical signal corresponding to the deformation. This can be effected in various known ways, for example by suitably varying the electrical conductivity of the measuring elements.

The other and outer end of the cylindrical tube 1 is shrink-fittingly clamped between a rigid casing base 7 and a hollow rigid cylinder 8 forming a lateral casing wall. The other and outer end of the cylindrical tube 2 as well as a force-introducing member 9 are firmly secured by a shrink-fit in a rigid inner peripheral edge of an annular guide membrane 10 which forms a casing cover for the force-measuring cell. The annular guide membrane 10 is also provided with a rigid outer peripheral edge by which it is shrink-fitted on the upper end, as viewed in FIG. 1, of the hollow cylindrical casing portion 8.

The deformation member formed of the cylindrical tubes 1 and 2 and the conical tube 4 is preferably formed of one piece, which is capable of being effected in an especially simple manner due to the rather favorable geometrical form thereof. The tube ends which serve to introduce the applied force and the reactive force, advantageously both are provided with a suitable shape, with shoulders, extensions or the like for forming a shrink-fit joint. The symmetrical structure of the deformation body with respect to a central plane extending horizontally in FIG. 1 produces, in the direction of the measurement axis 3 from both sides of the central horizontal plane, heat-conductive paths of uniform length to the deformation body and to the measuring elements 5 and 6 disposed thereon, so that a favorable temperature characteristic is afforded. In addition the space requirement for the force-measuring cell of my invention is very small, especially in the measurement direction in which, for the most part in practice, little space is available. This advantage provided by the expedient construction of the force-measuring cell of my invention is further enhanced by the fact that the cylindrical tubes 1 and 2 concentrically telescope one another.

When the casing base 7 is supported on an abutment or counterbearing and a compressive force is introduced in direction of the arrow shown in FIG. 1 to the force-introducing member 9 a reactive force is introduced at the lower end of the tube 1, as viewed in FIG. 1, as the force-introducing member is guided through the membrane 10 exactly in the measuring direction of the axis 3 and transmits the applied force, that is to be measured, to the upper end of the tube 2, as viewed in FIG. 1. Under the action of the applied and reactive forces and due to the connection provided by the conical tube 4, the tubes 1 and 2 become inclined with respect to the axis 3 i.e., the diameter of the annular face of the tube end adjacent the measuring element 5 is reduced and the diameter of the annular face of the tube end adjacent the measuring element 6 is increased in accordance with the force being measured. When the measuring elements 5 and 6 are suitably connected into an amplifying-electric circuit the electrical signals of the measuring elements 5 and 6, which are in proportion to the force applied, are amplified in a conventional manner.

When measuring a tensile force, the casing base 7 must be anchored in a suitable manner as indicated by the provision of a threaded or screw connection 11, and the force-introducing member 9 must be connected to the source of the applied force by a threaded, clamping or similar connection. The operation of the force-measuring cell in such case is, nevertheless, analogous to the aforedescribed operation, the measuring element 5 being expanded and the measuring element 6 being compressed. Obviously, the installation of the force-measuring cell in other spatial locations for suitably anchoring the same is readily possible.

The form of the force-measuring cell of FIG. 1 permits the use thereof also for measuring relatively high forces when suitable choice of the material and the thickness of the walls of the deformation member has been made. The advantage of the compact construction can be maintained also for measuring very high forces with the embodiment of FIG. 2. In FIG. 2, the deformation member 1, 2, 4 constructed substantially as in the embodiment of FIG. 1, is connected in parallel with an auxiliary deforming member 12 with respect to the transmission of force therein. The deformation member 12 has substantially the shape of a hollow cylinder and is shrink-fittingly, rigidly connected through suitable shoulders, formed at both ends thereof, to the applied force and reactive force-introducing ends of the tubes 2 and 1, respectively. The force transmission is thereby divided between both the deformation member 1, 2, 4 and the auxiliary deformation member 12. The auxiliary deformation member 12 is provided with such dimension that, within the measuring range of the force-measuring cell of the invention, the deformation path in measurement direction produced therein by the part of the force absorbed thereby is the same, respectively, as the deformation path produced in the deformation member 1, 2, 4 by the part of the force absorbed by the latter member. In order to equalize or balance manufacturing tolerances and to afford trouble-free transmission of the force and the deformation path, consequently, to the deformation member 1, 2, 4, an incompressible intermediate layer 2a of suitable material is interposed between the two deformation members. Incompressible materials which can be used for the layer 2a are hardenable multicomponent resins or plastic materials, metals such as lead, for example, care being taken that the surfaces thereof have no roughness which could cause pointlike stressing, and incompressible liquids such as oil, for example, suitable containment thereof being necessary, however.

I claim:

1. Electromechanical force-measuring cell comprising a deformation member formed of two cylindrical tubes of different diameters having a common central axis extending in the direction of measurement of a force, one end of each said tubes being adapted, respectively, to absorb an applied force and a force reactive thereto, a conical tube interconnecting the other ends, respectively, of said tubes, said other ends facing in opposite directions along said common central axis, and force-measuring means comprising a mechanical-to-electrical transducing device disposed at the respective other ends of said cylindrical tubes to which the conical tube is connected for converting to an electrical signal a deformation produced in the deformation member by action of a force applied thereto.

2. Electromechanical force-measuring cell according to claim 1 wherein said cylindrical tubes concentrically telescope one another.

3. Electromechanical force-measuring cell according to claim 1 including a hollow rigid casing portion surrounding said deformation member, and a casing base located at one end of said hollow casing portion, the one end of the tube adapted to absorb the reactive force being shrink-fittingly clamped between said hollow casing portion and said casing base.

4. Electromechanical force-measuring cell according to claim 3 including an annular casing cover formed as a guide membrane and having rigid outer peripheral and inner peripheral edge portions, and a force-introducing member located at the one end of the other tube adapted to absorb the applied force, the force-introducing member and said one end of said other tube being shrink-fittingly secured by said inner peripheral edge portion of said guide membrane, said outer peripheral edge portion of said guide membrane being shrink-fittingly secured to said hollow rigid casing portion.

5. Electromechanical force-measuring cell according to claim 1 including an auxiliary deformation member connected in parallel force-transmitting relationship to said first-mentioned deformation member whereby the applied force is absorbed in part by both of said deformation members, said auxiliary deformation member being of such dimension that the part of the applied force absorbed thereby produces a deformation therein, within the measuring range and in the measurement direction, that is equal in size to the deformation produced in the first-mentioned deformation member by the part of the applied force absorbed thereby.

6. Electromechanical force-measuring cell according to claim 5 wherein said auxiliary deformation member is substantially tubular in shape and coaxially surrounds the first-mentioned deformation member.

* * * * *